United States Patent [19]
Wagner et al.

[11] 3,783,757
[45] Jan. 8, 1974

[54] PHOTOGRAPHIC APPARATUS FOR THE MAKING OF EXPOSURES IN ARTIFICIAL LIGHT

[75] Inventors: Karl Wagner, Ottobrunn; Otto Rosenberg, Grunwald; Adam Hummel, Munich, all of Germany

[73] Assignee: Agfa-Gevaert Aktiengesellschaft, Leverkusen, Germany

[22] Filed: Mar. 14, 1972

[21] Appl. No.: 234,576

[30] Foreign Application Priority Data
Mar. 16, 1971 Germany.................. P 21 12 599.5

[52] U.S. Cl. ........................... 95/10 CE, 95/11.5 R
[51] Int. Cl. .............................................. G03b 15/05
[58] Field of Search .................... 95/10 C, 11.5 R, 95/10 CE

[56] References Cited
UNITED STATES PATENTS

| | | | |
|---|---|---|---|
| 3,350,603 | 10/1967 | Erickson | 95/11.5 X |
| 3,532,035 | 10/1970 | Fujii et al. | 95/10 |
| 3,638,543 | 2/1972 | Kondo | 95/11.5 X |
| 3,626,827 | 12/1971 | Yanagi et al. | 95/10 |
| 3,424,071 | 1/1969 | Schwahn | 95/11.5 |
| 3,296,947 | 1/1967 | Engelsmann et al. | 95/11.5 X |
| 2,901,671 | 8/1959 | Most | 95/11.5 X |

*Primary Examiner*—Samuel S. Matthews
*Assistant Examiner*—Michael L. Gellner
*Attorney*—Michael S. Striker

[57] ABSTRACT

A still camera wherein the main diaphragm can be adjusted by a focussing ring is coupled with or incorporates an electric flash unit wherein a photosensitive receiver which measures the amount of light reflected from the subject is located behind an adjustable auxiliary diaphragm. The auxiliary diaphragm is adjustable with the main diaphragm to change the threshold value of the control circuit of the flash unit. The motion transmitting connection between the main diaphragm and the auxiliary diaphragm is separable in response or prior to detachment of a removable flash unit so that the main diaphragm can be adjusted by the focussing ring when the flash unit is detached or when the housing of the camera is connected with a different flash unit.

10 Claims, 4 Drawing Figures

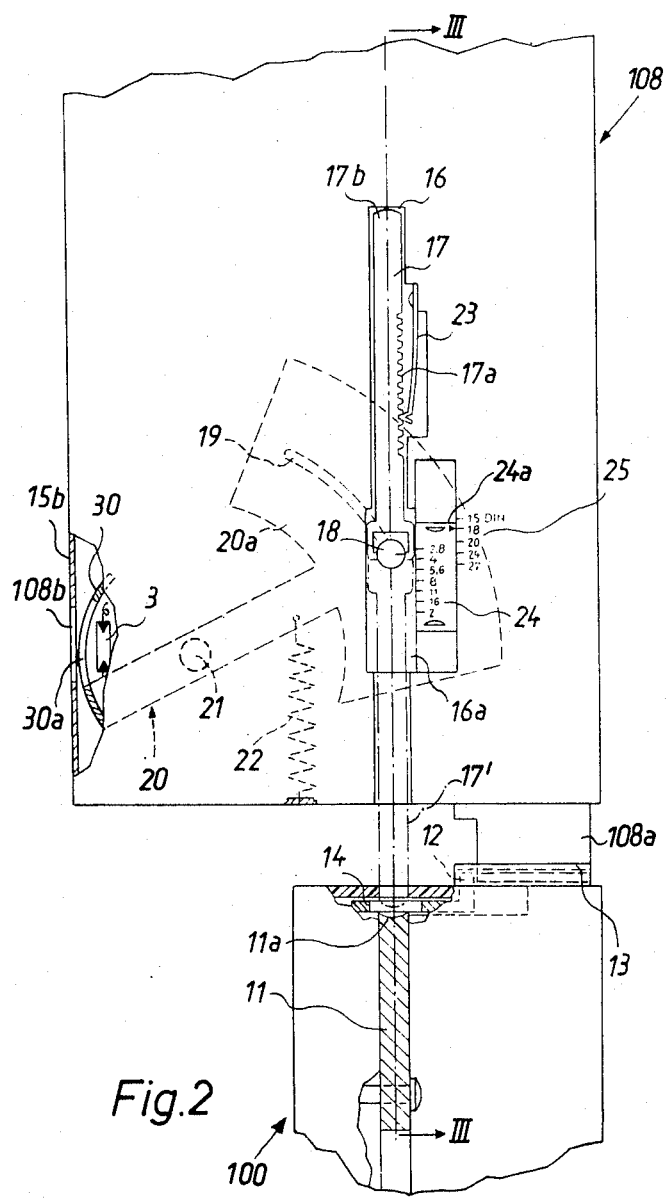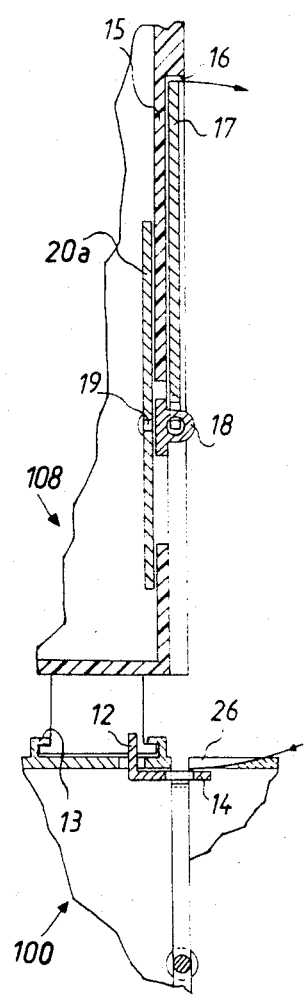
Fig.2
Fig.3

PHOTOGRAPHIC APPARATUS FOR THE MAKING OF EXPOSURES IN ARTIFICIAL LIGHT

BACKGROUND OF THE INVENTION

The present invention relates to photographic apparatus in general, and more particularly to improvements in photographic apparatus which can be used with or without built-in or separable sources of artificial light, especially electronic flash units. Still more particularly, the invention relates to improvements in photographic apparatus for use with sources of artificial light which are preferably of the type having means for determining the duration of artificial illumination on the basis of integrated measurement of the amount of light which is reflected from the subject or scene.

It is already known to provide cameras which utilize or embody such sources of artificial light with a main diaphragm which is adjustable by the focussing means so that the size of the light-admitting aperture can be changed as a function of the distance from the subject.

There are two known methods of facilitating the manipulation of a camera which is coupled or equipped with an electronic flash unit so that the user need not be concerned with the guide number of the flash unit in addition to considering the brightness of the subject and the distance from the subject. In accordance with a first known proposal, the focussing means is coupled with the main diaphragm in such a way that the aperture size is adjustable as a function of the selected distance from the subject (i.e., as a function of selected setting of the focussing means) and that the aperture size is further a function of the guide number of the flash unit. A drawback of such proposal is that the exposures with artifical illumination are made without consideration of certain important parameters, such as the reflectivity of the subject and of the area surrounding the subject. Furthermore, the quality of pictures which are taken with flash depends to a considerable extent on the accuracy with which the setting of the focussing means reflects the actual distance from the subject. In other words, a camera without a sensitive and reliable range finder will fail to make satisfactory exposures with flash unless the user actually measures the distance from the subject.

In accordance with a second known proposal, the flash unit embodies a photosensitive receiver which measures the amount of light which is reflected from the subject, and an electronic circuit which compares the thus measured and integrated value with a predetermined value. If the measured value reaches the predetermined value, the gas discharge in the tube of the flash unit is interrupted in that the capacitor which furnishes the current is short-circuited by means of a quenching tube or a thyristor.

A drawback of this proposal is that a fixed $f$-stop is associated with each film speed. The selected $f$-stop must satisfy two irreconcilable requirements, namely, the aperture size should be as large as possible in order to take into consideration the maximum range of the flash unit and the aperture size should be as small as possible in order to insure an acceptable depth of field. In conventional relatively small still cameras, the $f$-stop "4" is required when the film speed is 18 DIN (German norms). Such $f$-stop is unsatisfactory when the camera employs an average picture taking lens and the distance from the subject is between 1–3 meters because the depth of field is insufficient. Consequently, the distance from the subject must be determined with a very high degree of accuracy — a requirement which cannot be met by a beginner or amateur photographer if the camera is not equipped with a reliable range finder.

It was further proposed to place an auxiliary diaphragm in front of the photosensitive receiver in the control circuit of the electronic flash unit. The auxiliary diaphragm is adjustable to increase the threshold value of the control circuit so that the camera using such flash unit can make satisfactory exposures with a smaller aperture size, i.e., the depth of field is more pronounced. However, the provision of an axuiliary diaphragm contributes to complicatedness of the camera, especially for a beginner or amateur photographer who is expected to carry out certain calculations and must be further capable of judging whether or not the maximum output of the flash unit, at the selected distance from the subject and at the existing reflectivity of the subject and the area surrounding the subject, suffices to make a satisfactory exposure with the desired $f$-stop. It was further proposed to test-fire the flash unit prior to the making of an exposure whereby the flash causes a complex and costly signal generating device to furnish a signal which indicates whether or not the selected $f$-stop is satisfactory for the contemplated exposure. The incorporation of such costly signal generating devices into popularly priced amateur cameras is unwarranted for obvious reasons. A flash unit with a diaphragm or a grey wedge in front of the photosensitive receiver is described by the German Pat. No. 1,772,617.

SUMMARY OF THE INVENTION

An object of the invention is to provide a novel and improved apparatus which is a combination of a photographic camera and a built-in or separable source of artificial light and exhibits all advantages but eliminates the drawbacks of presently known apparatus in that it can make satisfactory exposures with flash even if the camera is not equipped with a range finder or employs a relatively inexpensive range finder.

Another object of the invention is to provide a novel and improved operative connection between the auxiliary diaphragm for the photosensitive means of the control circuit in a separable or built-in source of artificial light and the main diaphragm of a photographic camera.

The invention resides in the provision of an apparatus for the making of exposures with or without artificial illumination of a subject. The apparatus comprises a camera having an adjustable main diaphragm (i.e., an iris diaphragm) which defines a light-admitting aperture of variable size, and focussing means (i.e., a ring on the lens barrel) which is actuatable to adjust the main diaphragm as a function of the distance from the subject (i.e., as a function of the selected position of the focussing means). The apparatus further comprises an electronic flash unit or an analogous source of artificial light which is associated with (built into or separably connected to) the camera and comprises a control circuit for integrated measurement of light which is reflected from the subject. The circuit can terminate the emission of artificial light when exposed to a predetermined amount of reflected light and comprises photosensitive receiver means which is exposed to scene light. The apparatus further comprises auxiliary diaphragm means which is located in front of the photosensitive receiver means and is adjustable to change the threshold valve of the circuit, and means for adjusting the auxiliary diaphragm means in response to adjustment of the main diaphragm by the focussing means.

The adjusting means for the auxiliary diaphragm means may be permanently installed in the camera housing, especially if the light source is built into the camera, or such adjusting means may comprise two separable motion transmitting portions so as to permit the focussing means to adjust the main diaphragm when the light source is detached and/or when the light source is replaced with another electronic flash unit or an analogous source of artificial light.

The novel features which are considered as characteristic of the invention are set forth in particular in the appended claims. The improved apparatus itself, however, both as to its construction and its mode of operation together with additional features and advantages thereof, will be best understood upon perusal of the following detailed description of certain specific embodiments with reference to the accompanying drawing.

BRIEF DESCRIPTION OF THE DRAWING

FIG. 2 is an enlarged fragmentary partly side elevational and partly vertical sectional view of a second combination wherein the entire flash unit is detachable from the housing of the camera;

FIG. 3 is a sectional view as seen in the direction of arrows from the line III—III of FIG. 2.

DESCRIPTION OF THE PREFERRED EMBODIMENTS

Figure 1:
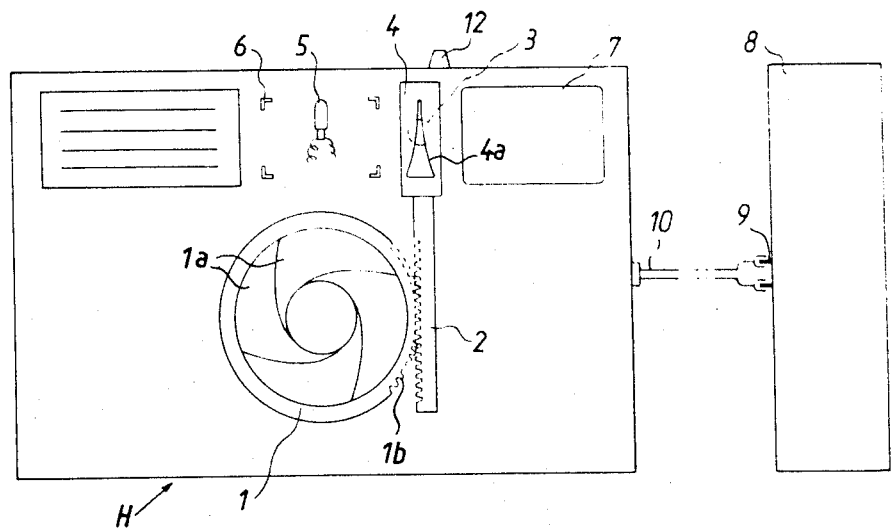
FIG. 1 is a schematic front elevational view of a combination of a still camera and an electronic flash unit which embodies one form of the invention and wherein the photoelectric receiver means and the auxiliary diaphragm are built into the housing of the camera.

Referring first to FIG. 1, there is shown a still camera having a housing H and an electronic flash unit 8. Certain component parts of the flash unit 8 are built into the housing H; such parts include a photosensitive receiver 3 and an auxiliary diaphragm or mask 4 having a bulbous or wedge-shaped light-admitting slot 4a. The main diaphragm of the camera is built into the barrel for the picture taking lens and comprises a set of blades or vanes 1a. The size of the light-admitting aperture which is furnished by the blades 1a can be selected by a rotary focussing ring 1 which is installed on the lens barrel. At least a portion of the focussing ring 1 is provided with external teeth 1b which mesh with the teeth of a reciprocable motion transmitting rack 2 supporting the auxiliary diaphragm 4. When the focussing ring 1 is rotated by hand, the rack 2 causes the auxiliary diaphragm 4 to increase or reduce the amount of scene light reaching the photosensitive receiver 3. The auxiliary diaphragm 4 can be termed a light-weakening device for the receiver 3 and hence for the control circuit of the flash unit 8. By moving the rack 2 through the intermediary of the focussing ring 1, the operator of the camera can adjust the threshold value of the control circuit in the flash unit.

The housing H further supports a customary selector 12 which can be manipulated by hand to assume either of two discrete positions in one of which the camera is set for operation with artificial illumination of the subject and in the other of which the camera is set for operation in daylight (i.e., without artificial illumination). The selector 12 is connected with a master switch (not specifically shown) in the circuit of the flash unit 8 and closes the master switch when it is caused to assume that position in which the camera is set for operation with artificial illumination of the subject.

A signal lamp 5 (e.g., a glow lamp) in the housing H lights up when the selector 12 assumes the position in which the camera is set to make exposures with flash. A mirror or the like, not shown, is provided to reflect the image of the lamp 5 and the image of a luminescent frame finder 6 into the view finder 7. The part denoted by the character 8 is the generator part of the electronic flash unit; this part can be built into or on the housing H or, and as shown in FIG. 1, it can be separably connected to the housing. To this end, the part 8 comprises accessible terminals 9 which can be plugged into a socket at one end of a cable 10 which is permanently or separably connected to the housing H. The electronic control circuit of the flash unit can be installed behind the reflector.

FIGS. 2 and 3 illustrate a portion of a modified camera which can be used with or without a separable electronic flash unit 108. The camera has a housing 100 the top wall of which carries a conventional accessory shoe 13 for reception of a foot 108a of the flash unit 108. The latter is a self-contained device, i.e., not only the photosensitive receiver 3 but also the auxiliary diaphragm 30 is installed in the casing of the unit 108.

The rack 2 of FIG. 1 is replaced by a reciprocable motion transmitting member 11 which is mounted in the housing 100 and can be reciprocated by a focussing ring or the like analogous to the ring 1 of FIG. 1. Such focussing ring also serves to adjust the aperture size furnished by the main diaphragm in the housing 100 of the camera. The upper end portion of the motion transmitting member 11 is provided with a concave surface 11a which is movable up or down, depending on the direction of rotation of the focussing ring.

The selector 12 is mounted in or on the top wall of the housing 100 in such a way that it is actuated in response to proper insertion of the foot 108a into the shoe 13. The selector 12 further serves to automatically move a platelike cover 14 from an operative or concealing position to an inoperative or retracted position (which is shown in FIG. 2) when the foot 108a is properly inserted into the shoe 13, i.e., when the camera is ready to make exposures with artificial illumination of the subject. When in its operative position, the cover 14 conceals the upper end portion of the motion transmitting member 11 in the housing 100. This cover 14 may be reciprocably or pivotably mounted in the camera. If the flash unit 108 of FIGS. 2 and 3 is built into the housing 100 of the camera, the selector 12 is accessible from without the housing so that it can be actuated by hand, the same as the selector 12 of FIG. 1. As mentioned before, the main purpose of the selector 12 is to close the master switch of the electronic flash unit when the camera is set for the making of exposures with artificial illumination of the subject.

The side wall 15 of the casing of the electronic flash unit 108 has an elongated vertical or nearly vertical groove or recess 16 for a second motion transmitting member 17 which can receive motion from the member 11 when the flash unit is properly secured to the housing 100 and when the second motion transmitting member 17 is moved from a first or upper position (shown in FIG. 3) to a second or lower position in which a convex surface 17b at the free end of the member 17 engages the concave surface 11a at the upper end of the member 11. It is evident that the positions of the surfaces 17b and 11a can be interchanged. The groove 16 serve as a guide or ways for the second motion transmitting member 17. The other end portion of the member 17 (namely, that end portion which is remote from the convex surface 17b) is mounted on a pivot member 18 which is slidable up and down in a slot 16a of the side wall 15. The slot 16a extends inwardly from the guide groove 16 and through the wall 15 so that the inner end portion of the pivot member 18 can be received in an arcuate slot 19 of a two-armed carrier lever 20 for the aforementioned auxiliary diaphragm 30. The second motion transmitting member 17 is shown as being pivotable through exactly 180° in order to move from the upper position shown in FIG. 3 by solid lines to the lower position 17' which is indicated in FIG. 2 by phantom lines. It is assumed that the motion transmitting member 17 is accessible to the user of the camera and can be pivoted by hand.

The width of the slot 16a exceeds the width of the remaining portion of the guide groove 16 in the side wall 15. The carrier lever 20 is pivotable in the casing of the flash unit 108 on a fixed pivot pin 21 and the end portion 20a of its right-hand arm (as viewed in FIG. 2) forms a mask or shield which is large ebough to overlie the inner end of the slot 16a in each angular position of the lever 20. The center of curvature of the slot 19 is located on the axis of the pivot pin 21, and it will be readily seen that the second motion transmitting member 17 can pitvot the carrier lever 20 in response to movement of the pivot 18 up or down lengthwise of the slot 16a. The aforementioned auxiliary diaphragm 30 is mounted on the shorter arm of the carrier lever 20 and is movable along an arcuate path in front of the photosensitive receiver 3 and behind a light-admitting opening 108b in the front wall 15b of the casing of the flash unit 108. A helical spring 22 which is anchored in the casing of the flash unit 108 is connected to and tends to turn the carrier lever 20 in a clockwise direction, as viewed in FIG. 2, so as to urge the second motion transmitting member 17 downwardly toward the opening which is exposed in the top wall of the camera housing 100 in response to movement of the cover 14 to its retracted position. Such downward movement of the member 17 is opposed and normally prevented by a detent structure including an elastic pawl 23 in the casing of the flash unit 108 and a row of teeth 17a provided along one edge face of the member 17. The arrangement is such that, when the member 17 is pivoted by hand to the phantom-line position 17' of FIG. 2 and the user of the camera rotates the aforementioned focussing ring 1 to thereby change the aperture size furnished by the main diaphragm and to move the first motion transmitting member 11 up or down, the member 11 can move the member 17 upwardly against the opposition of the spring 22 (it is to be noted that, when it dwells in the position 17', the member 17 is disengaged from the pawl 23). On the other hand, when the focussing ring moves the member 11 downwardly, the spring 22 is free to contract and the surfaces flanking the arcuate slot 19 in the mask 20a of the carrier lever 20 cause the pivot member 18 to move the member 17 downwardly so that the convex surface 17b continues to abut against the concave surface 11a.

The auxiliary diaphragm 30 has a bulbous or wedge-like cutout 30a which corresponds to the cutout 4a shown in FIG. 1 and determines the amount of scene light which can reach the photosensitive receiver 3 of the flash unit in different angular positions of the carrier lever 20. As shown in FIG. 2, the auxiliary diaphragm 30 is preferably of arcuate shape so that it is located at a constant distance from the receiver 3 irrespective of the angular position of the carrier lever 20. Thus, the center of curvature of the auxiliary diaphragm 30 is preferably located on the axis of the pivot pin 21.

The bias of the elastic pawl 23 is strong enough to effectively oppose the bias of the spring 22 so that, when the second motion transmitting member 17 is moved to the upper position shown in FIG. 3 and the pallet of the pawl 23 enters the space between two adjacent teeth 17a of the member 17, the spring 22 is incapable of pivoting the carrier lever 20 in a clockwise direction in order to move the pivot member 18 downwardly. It will be noted that a portion of the pivot member 18 extends forwardly beyond the exposed surface of the side wall 15 so that it can be grasped, pulled or pushed by one or more fingers in order to forcibly change the position of the carrier lever 20 against the opposition of the elastic pawl 23 under or against the bias of the spring 22. Such manual shifting of the motion transmitting member 17 preferably necessitates the exertion of a relatively small or moderate force. The carrier lever 20 will be adjusted by hand (by way of the motion transmitting member 17 while the latter dwells in the upper position shown in FIG. 3) when the user of the flash unit 108 wishes to manually select the threshold value of the scene brightness at which the control circuit of the flash unit responds. The exposed portion of the pivot member of joint 18 can also serve as an index or pointer which is movable along an f-stop scale 24 supported by the side wall 15 of the casing of the flash unit 108. Thus, the user can immediately determine the setting of the main diaphragm in the lens mount of the camera including the housing 100. In accordance with a presently preferred embodiment, the f-stop scale 24 constitutes a slide which is reciprocable along the side wall 15 and has an index or marker 24a which is movable into register with a selected graduation of a second scale 25 provided on the side wall 15. The graduations of the second scale 25 indicate different film sensitivities. Thus, when the user inserts into the housing 100 a certain type of film, and when the user wishes to use such film for the making of exposures with artificial illumination of the subject furnished by the flash unit 108 of FIGS. 2 and 3, the f-stop scale 24 on the side wall 15 of the casing 108 is adjusted to insure that the index 24a registers with that graduation which is indicative of the sensitivity or speed of film in the housing 100. By looking at the scale 24, and by observing the position of the index or pivot member 18, the user of the camera can read the aperture size furnished by the main diaphragm when the member 17 dwells in the position 17' so that it can receive motion from the member 11 or from the spring 22 and mask 20a of the carrier lever 20. The distances between successive tooth spaces defined by the teeth 17a of the second motion transmitting member 17 preferably equal the distances between successive f-stop graduations on the scale 24. Thus, each displacement of the member 17 by the member 11 and focussing ring in the camera including the housing 100 by a distance corresponding to that between two neighboring tooth spaces defined by the teeth 17a corresponds to a change in the aperture size of the main diaphragm by a full f-stop.

If the flash unit of FIGS. 2 and 3 is to be fired automatically in response to actuation of the camera release, the second motion transmitting member 17 must be pivoted through 180° so as to move from the solid-line position of FIG. 3 to the phantom-line position 17' of FIG. 2. As shown in FIG. 3, the top wall of the housing 100 has a suitably configurated recess 26 through which the convex surface 17b of the member 17 can pass during the last stage of its movement toward the phantom-line position 17'. The surface 17b is then in register with the concave surface 11a of the member 11, it being assumed that the foot 108a is properly received in the shoe 13 so that the selector 12 has moved the cover 14 to the retracted position shown in FIG. 2. Since the teeth 17a are disengaged from the pallet of the detent pawl 23 shortly after the member 17 leaves the upper position of FIG. 3, the spring 22 is free to contract and to bias the convex surface 17b against the concave surface 11a as long as the member 17 dwells in the position 17'. Consequently, a lifting or lowering of the member 11 by way of the focussing ring will cause the auxiliary diaphragm 30 to move its cutout 30a with reference to the photosensitive element 3 and to thereby change the amount of scene light which can reach the receiver 3 by way of the opening 108b. Thus, the members 11 and 17 then establish a motion transmitting connection between the focussing ring (which is the adjusting or setting means for the main diaphragm) and the auxiliary diaphragm 30.

Figure 4:
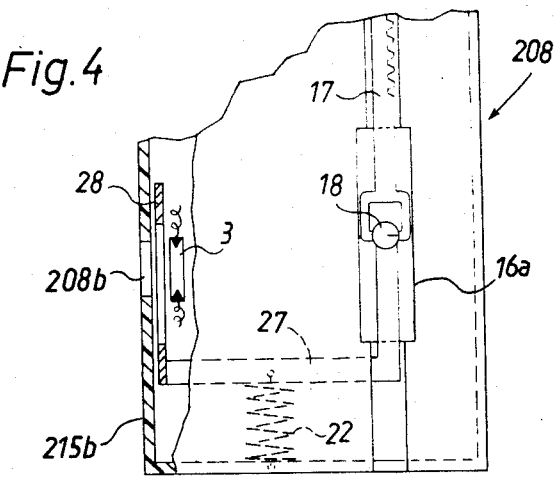
FIG. 4 is a fragmentary partly elevational and partly vertical sectional view of a flash unit which constitutes a modification of the flash unit shown in FIG. 2.

As shown in FIG. 4, the pivotable carrier lever 20 of FIGS. 2 and 3 can be replaced with a U-shaped yoke-like carrier 27 which is reciprocable in the casing of the flash unit 208 in response to movement of the pivot member or joint 18 along the slot 16a. The spring 22 acts on the web of the U-shaped carrier 27 and tends to move it downwardly so as to maintain the auxiliary diaphragm 28 in one if its end positions. This diaphragm 28 can constitute one arm or flange of the U-shaped carrier 27 and is movable between the photosensitive receiver 3 and the opening 208b in the front wall 215b of the casing of the flash unit 208. It is preferred to provide the casing of the flash unit 208 with suitable guide means (not specifically shown) which confines at least the arm or auxiliary diaphragm 28 of the carrier 27 to reciprocatory movement in the casing of the flash unit to thus prevent jamming of the auxiliary diaphragm in response to movement of the joint 18 along the slot 16a. It will be seen that the invention can be embodied in flash units which employ pivotable, reciprocable or otherwise movable auxiliary diaphragms.

An advantage of the camera-flash unit combination of FIGS. 1–4 is that the camera can be used with the illustrated flash unit (with adjustable auxiliary diaphragms) as well as with conventional flash units. Thus, the focussing ring 1 can be used to adjust the main diaphragm in dependency on the distance from the subject irrespective of whether or not the auxiliary diaphragm 4, 30 or 28 is located in front of the photoelectric receiver (3) of a flash unit. Furthermore, each of the three ilustrated flash units 8, 108, 208 is preferably designed in such a way that it can be used with the improved camera (which embodies motion transmitting means for adjusting the auxiliary diaphragm) or with conventional cameras. If the improved flash unit is used with a conventional camera, the auxiliary diaphragm is adjusted by hand. Thus, and referring to FIGS. 2–3, the pivot member 18 can be moved by hand (while the motion transmitting member 17 dwells in the position shown in FIG. 3) to thereby change the position of the auxiliary diaphragm 30 by way of the carrier lever 20 and against the opposition of the detent pawl 23.

The connection between the focussing means of the camera and the main diaphragm is preferably selected in such a way that it corresponds to less than the maximum output of the flash unit. This insures that there remains a reserve of preferably one f-stop for the making of exposures under less than most favorable circumstances.

A comparison of f-stops for frequently occuring situations (which necessitate the use of the aforementioned flash units) with the smallest f-stops which can still be used under such circumstances and with the f-stops which are selected by the camera of the present invention reveals the following.

| Distance in meters | A | | | B | | | C | | | D | | |
|---|---|---|---|---|---|---|---|---|---|---|---|---|
|  | h | n | d | h | n | d | h | n | d | h | n | d |
| 3 | 5.6 | 5.6 | 5.6 | 4 | 4 | 4 | 4 | 4 | 4 | 8 | 5.6 | 4 |
| 1.75 | 11 | 11 | 11 | 4 | 4 | 4 | 8 | 8 | 8 | 16 | 11 | 8 |
| 0.75 | 22 | 22 | 22 | 4 | 4 | 4 | 16 | 16 | 16 |  | 22 | 16 |

In the table, A represents the adjustment of the distance and main diaphragm, B represents the electronic flash unit with a fixed f-stop of "4," C the values for the improved combination, and D the values which correspond to the smallest f-stop (guide number calculated by considering the brightness of the subject and the surrounding area).

It is assumed that the maximum guide number of the employed flash unit is "16" and that the speed of film in the camera is 18 DIN. For each exposure with flash, there exist three different possibilities for the prevailing circumstances, namely, the possibility h for cimcumstances which necessitate less than normal artificial illumination, the possibility n for circumstances which necessitate a normal or average illumination, and the possibility d for circumstance which necessitate more than average illumination.

The underlining of certain specific values in the column A is intended to indicate that the selected f-stops will result in improper exposures. In the column B, the exposure is regulated by changing the duration of the flash while the f-stop (4) remains unchanged. The column C shows f-stops which are selected by the improved camera-flash unit combination at a constant distance from the subject by changing the duration of flash, and at a varying distance from the subject by varying the aperture size.

It will be seen that the f-stops selected by the combination of the present invention (column C) come nearer to the optimum f-stops (column D) than the f-stops which are selected by conventional combination (column B). The aforementioned reserve of one full f-stop is applied if the estimated distance is shorter than the actual distance from the subject or when required by unfavorable circumstances at the time the exposure with flash is being made. An unsatisfactory estimation of the distance from the subject which results in satisfactory exposure (column B) but produces a blurred image because of insufficient depth of field is compensated for (column C) by greater depth of field as a result of the selection of a smaller f-stop.

It is further clear that the iris diaphragm embodying the blades or vanes 1a of FIG. 1 can be replaced with a less complex main diaphragm, for example, with a diaphragm comprising a single blade or two blades. All that counts is to couple the main diaphragm with the focussing means in such a way that the size of the aperture furnished by the main diaphragm can be altered in response to movement of the focussing means to a position which is indicative of the estimated or actual distance from the subject or scene, and that the camera and/or the flash unit embody means for automatically adjusting the auxiliary diaphragm 4, 30 or 28 in response to adjustment of the main diaphragm by way of the focussing means when the camera is set to make exposures with artificial illumination of the subject. Furthermore, the auxiliary diaphragm 4, 30 or 28 can be replaced with a different diaphragm, for example, with a diaphragm which is similar to the iris diaphragm embodying the blades 1a shown in FIG. 1 or a diaphragm with one or two blades or vanes. Still further, the auxiliary diaphragm may employ one or more reciprocable or pivotable grey wedges of varying density.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims.

We claim:

1. Apparatus for the making of exposures with artificial illumination of a subject, comprising a camera having an adjustable main diaphragm defining a light-admitting aperture of variable size and focussing means actuatable to adjust said main diaphragm as a function of the distance from the subject; a source of artificial light associated with said camera and comprising a control circuit for integrated measurement of light which is reflected from the subject, said circuit being arranged to terminate the emission of artificial light when exposed to a predetermined amount of reflected light and including photosensitive receiver means exposed to scene light; auxiliary diaphragm means located in front of said receiver means and being adjustable to change the threshold value of said circuit; and motion transmitting means for adjusting said auxiliary diaphragm means in response to adjustment of said main diaphragm means by said focussing means.

2. Apparatus as defined in claim 1, wherein said camera further comprises a housing and said source further comprises a casing, and further comprising means for separably connecting said casing with said housing, said motion transmitting means comprising mechanical motion transmitting means including separable first and second portions respectively provided in said housing and said casing, said first portion receiving motion from said focussing means and transmitting motion to said auxiliary diaphragm means by way of said second portion when said casing is connected with said housing.

3. Apparatus as defined in claim 2, wherein said main diaphragm is also adjustable by said focussing means when said casing is separated from said housing.

4. Apparatus as defined in claim 2, wherein said housing comprises means for supporting sources other than said first mentioned source and said first portion of said motion transmitting means is movable by said focussing means when said housing supports one of said other sources.

5. Apparatus as defined in claim 1, further comprising means for adjusting said auxiliary diaphragm means independently of said main diaphragm means.

6. Apparatus as defined in claim 1, wherein said focussing means is arranged to adjust said main diaphragm to furnish an aperture whose size is less than that corresponding to a maximum light output of said source.

7. Apparatus as defined in claim 1, wherein at least a portion of said source, including said auxiliary diaphragm means, is built into said camera.

8. Apparatus as defined in claim 1, wherein said motion transmitting means comprises a portion provided in said source and movable by hand to and from a position in which said portion automatically adjusts said auxiliary diaphragm means in response to adjustment of said main diaphragm.

9. Apparatus as defined in claim 1, wherein said source is an electronic flash unit and said control circuit includes means for effecting an integrated measurement of artificial light which is reflected by the subject onto said receiver means.

10. Apparatus as defined in claim 1, wherein said camera is a still camera.

* * * * *